United States Patent
Sharma et al.

(10) Patent No.: US 7,538,681 B1
(45) Date of Patent: May 26, 2009

(54) METHOD AND APPARATUS FOR MONITORING CONTAINERIZED ID TAGGED ASSETS

(75) Inventors: Jugal Sharma, Irving, TX (US); John Crossno, Irving, TX (US)

(73) Assignee: OnAsset Intelligence, Inc., Irving, TX (US)

( * ) Notice: Subject to any disclaimer, the term of this patent is extended or adjusted under 35 U.S.C. 154(b) by 319 days.

(21) Appl. No.: 11/533,207

(22) Filed: Sep. 19, 2006

(51) Int. Cl.
 *G08B 13/14* (2006.01)
(52) U.S. Cl. ............ 340/572.7; 235/375; 235/385
(58) Field of Classification Search ... 340/572.1–572.9; 235/375–385
See application file for complete search history.

(56) References Cited

U.S. PATENT DOCUMENTS

| | | | | |
|---|---|---|---|---|
| 7,242,301 | B2 * | 7/2007 | August et al. ............ | 340/572.1 |
| 7,256,682 | B2 * | 8/2007 | Sweeney, II ............. | 340/10.1 |
| 2004/0135691 | A1 * | 7/2004 | Duron et al. ............ | 340/572.7 |
| 2004/0205350 | A1 * | 10/2004 | Waterhouse et al. ....... | 713/182 |
| 2005/0086983 | A1 * | 4/2005 | Stevens et al. ............ | 70/277 |
| 2005/0149226 | A1 * | 7/2005 | Stevens et al. ........... | 700/214 |
| 2006/0164232 | A1 * | 7/2006 | Waterhouse et al. ....... | 340/506 |
| 2006/0208899 | A1 * | 9/2006 | Suzuki et al. ........... | 340/572.7 |

OTHER PUBLICATIONS

Saxony-Anhalt Newsletter, edition 10, Oct. 20, 2005, Sachsen-Anhalt, Wir stehen fruher auf., "Goods Sent Safely in Smart-Box from Magdeburg", (pp. 3 and 4), by Die Drawatterie, Germany.
RFiD Journal, Jan. 4, 2007, "DHL to Market RFID-enabled Smart Box", pp. 1 and 2, by Rhea Wesseli, Germany.

* cited by examiner

*Primary Examiner*—Davetta W Goins
*Assistant Examiner*—Edny Labbees
(74) *Attorney, Agent, or Firm*—Bruce C. Lutz

(57) ABSTRACT

A method and apparatus is provided for strategically arranging ID tag antennas in a container to accommodate various sizes of tagged assets and to assure a reading of all assets in the container when the tagged assets have different packing densities. An antenna bus in each container, that is connected to a container ID tag reader, allows bus connector insertable antennas to be strategically placed for accommodating various asset packing densities. The containers are designed to readily interconnect the data outputs of all the tag readers when the containers are stacked in any of three dimensions whereby a single master unit collects data from all the readers and transmits the data to a central data collection point.

9 Claims, 4 Drawing Sheets

METHOD AND APPARATUS FOR MONITORING CONTAINERIZED ID TAGGED ASSETS

FIELD OF THE INVENTION

The present invention relates generally to a method of securing, monitoring the location of and/or controlling the environment of a plurality of ID tagged assets in one or more stackable or otherwise contiguous containers while the assets are being transported between locations.

DESCRIPTION OF THE RELATED ART

There are numerous prior art examples of monitoring the location of containers having specific assets. Further there are some instances of monitoring the environment both internal to and external of a container of assets while being transported between a source and a destination.

It is also known to employ some type of memory in conjunction with a container that incorporates a list of all the assets within the container initially. Typically some human intervention is required to update this list when assets are to be removed from or added to the container before the container arrives at its' final destination. This is often true even when each of the assets is RFID tagged and there is a RFID tag reader arranged near the portal of the container. In theory the tag reader is able to update memory as RFID tagged assets are removed from or added to the container, but that does not always occur.

When a container has only a few ID tagged assets, it is sometimes possible to read all the ID tags in a container using conventional techniques. However, there is no known prior art that can accurately scan a large number of tagged assets packed together in a container.

It would thus be desirable to have a method or technique of arranging or modifying tag readers and antenna structures whereby many ID tags of tagged assets in a container may be accurately read at any time whereby an up-to-date inventory of assets may be maintained. It would further be desirable to be able to economically interconnect a plurality of containers whereby a single master device can collect data read from the plurality of containers as well as other sensed data and transmit the collected data to a central data bank.

BRIEF DESCRIPTION OF THE DRAWINGS

For a more complete understanding of one or more embodiments of the present invention and the advantages thereof, reference is now made to the following descriptions taken in conjunction with the accompanying drawings, in which.

DETAILED DESCRIPTION

Figure 1:
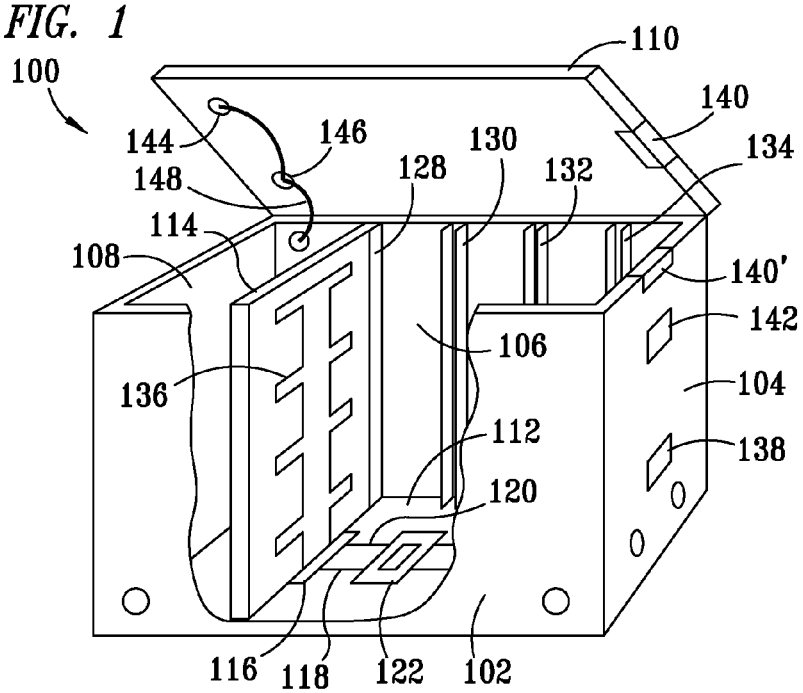
FIG. 1 exemplifies, in perspective format, major components utilized in constructing a stackable multi-antenna container in accordance with one embodiment of the invention.

FIG. 1 is a perspective view of a container, generally designated as 100 and having a front portion 102, a first end portion 104, a back portion 106 a second end portion 108, a lid or cover 110 and a bottom portion 112. In FIG. 1, a portion of front portion 102 is cut-away to more clearly show details of the interior of container 100. Within container 100 there is shown a single antenna, antenna fixture or antenna structure 114 inserted into a connector 116 comprising a portion of an antenna bus utilizing a conductive medium. As shown, this bus comprises two sets of conductive paths 118 and 120 to which other connectors 122, 124 and 126 are attached as shown more clearly in FIG. 2. These sets of conductive paths allow each antenna to be isolated from other antennas while connected to a container tag reader. Also shown in both figures are antenna or antenna structure guides 128, 130, 132 and 134 to provide greater lateral stability of the antenna when the container 100 is quickly moved. While the guides 128, 130, 132 and 134 are shown to extend from the interior surface of the container, they may be recessed into the walls or eliminated altogether when other support is available or alternatively is not needed in view of the design an insertable antenna structure. It may be noted that a stability feature similar to the guide 128 may likewise or alternatively be comprise a portion of the lid 110.

Normally, the added stability, provided by antenna guides, is highly desirable if there are a large number of heavy objects, whether or not ID tagged, located between antenna 114 and the end 108 when the container is moved suddenly or repositioned so that end 108 becomes an upper surface. This becomes especially desirable when additionally there are no objects on one side of an antenna such as 114 and many heavy objects on the other side.

A wandering line 136 is shown on one surface of antenna 114 as being representative of the conductive path used to transmit or receive RF signals. It is to be understood that the antenna conductive element may be on the surface of a supportive backing, protected from abrasion by being intermediate two insulating supportive layers or in some instances may be self supporting. Thus the line 136 is merely intended to illustrate that an antenna inserted into a connector such as 116 is readily able to detect signals from tags located at any height within container 100.

A tag reader 138 is illustrated as being embedded on a lower portion 138 of end 104 of container 100. The tag reader may vary in complexity depending upon application. Thus in some instances, where the container will not be stacked or otherwise combined with other similar containers, the tag reader 138 may include GPS circuitry, satellite or other wireless communication capability to a central or handheld database, a CPU, electronic memory, access authorization circuitry for verifying that an entity attempting access is authorized to do so and so forth. However, in a first preferred embodiment, the reader will merely read tagged assets in the container and provide that information to a master unit that is in communication with at least one other similar container. The sets of conductive paths 118 and 120 previously mentioned allow each antenna to be isolated from other antennas while selectively connected to tag reader 138. An electrically or electronically controlled lock 140 is shown incorporated into the lid 110. A mating portion of the lock 140 is shown on end portion 104 as 140'. Although no lock details are shown, the lock 140 merely needs to lock or unlock only after an authorization signal is received from some entity such as the tag reader 138 or from a device external to the container 100. A portal 142 on end 104 is used to represent an authorization port. This may preferably constitute a USB (Universal Serial Bus) port for connection to a computer, a card reader, a finger print scanner and so forth. The portal 142 may actually comprise a unit such as a card reader or similar authorization device.

Figure 5:
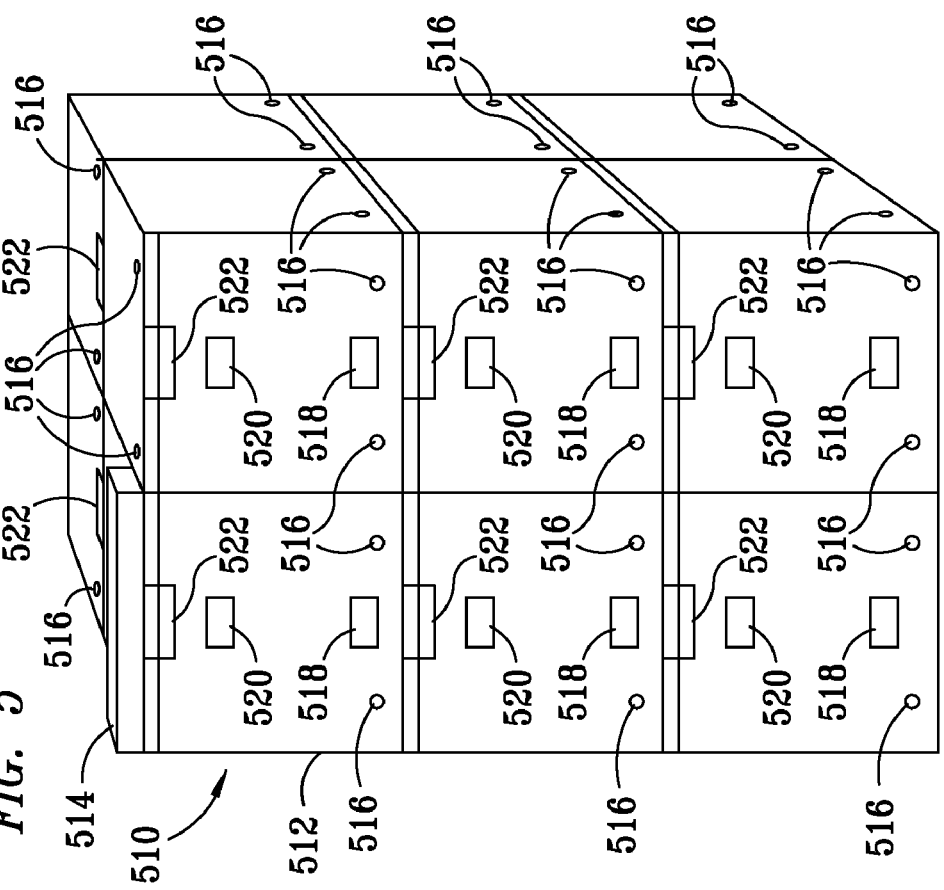
FIG. 5 exemplifies a perspective view of a plurality of containers stacked in three dimensions.
Figure 4:
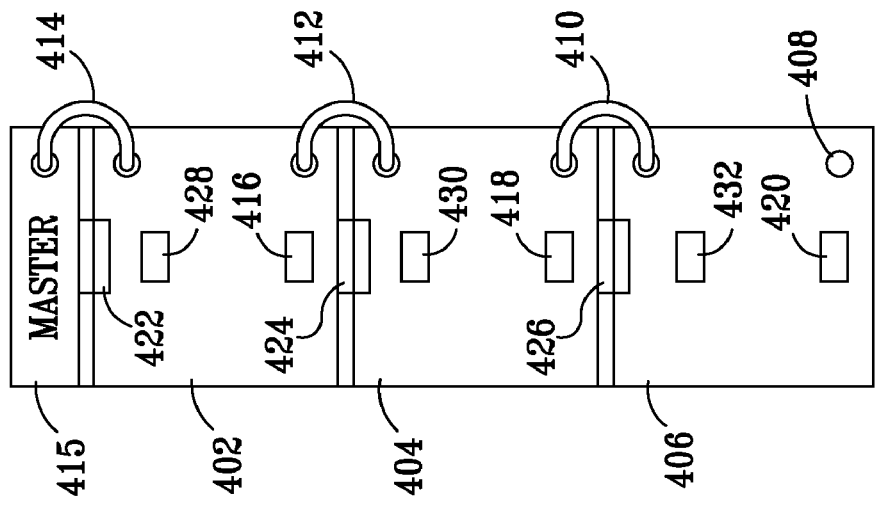
FIG. 4 exemplifies a side view of a plurality of stacked containers utilizing a second embodiment of the invention using wired inter container communication.
Figure 6:
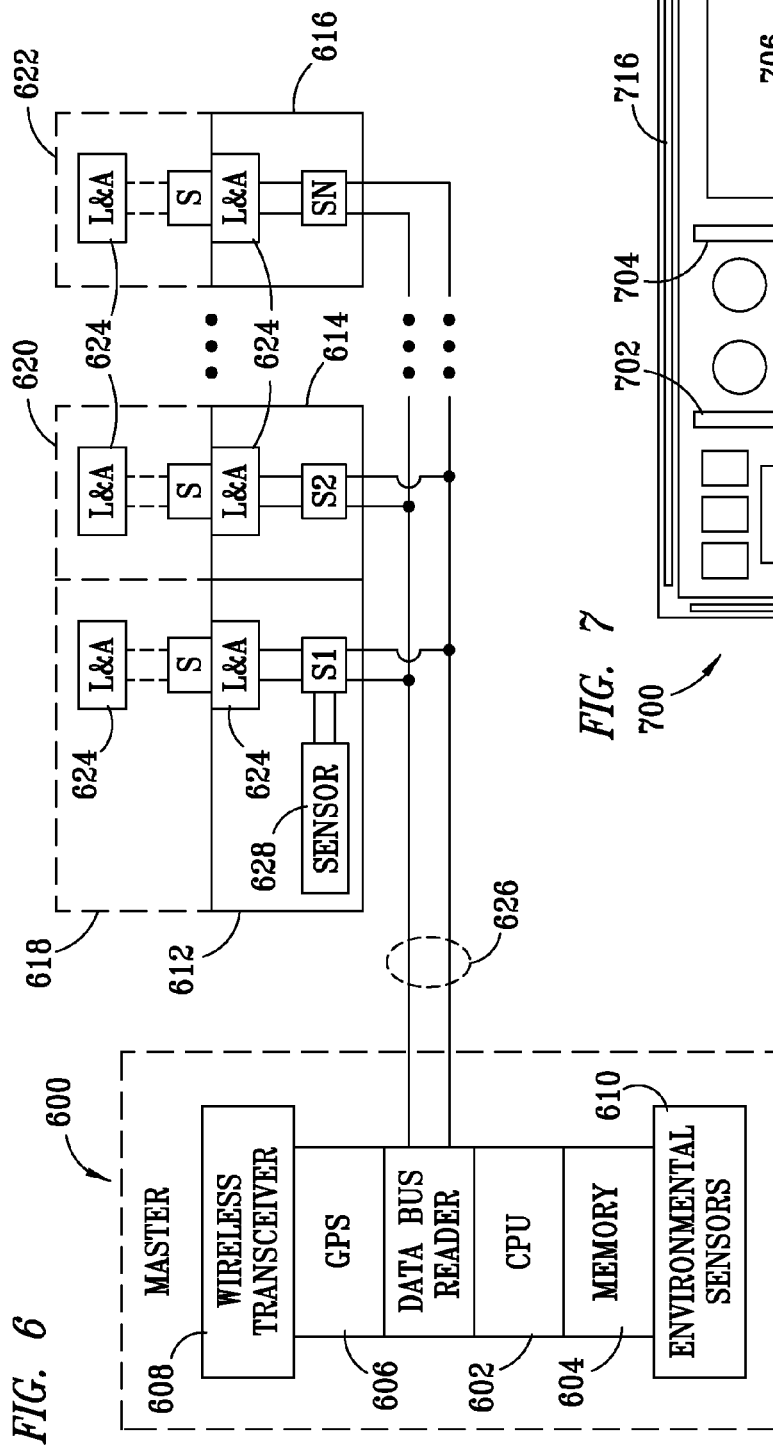
FIG. 6 exemplifies a generalized electrical configuration for collecting and distributing ID tag data, sensed data and container access data.

The container 100 is designed to electrically connect to a data or reader bus of other containers. This interconnection may be provided by wires, cables or other mating connectors having male and female portions and extending from an outer surface of the container. In such a configuration, these cables or connectors will need to be interconnected as the containers are stacked one upon another or adjacent one another. To reduce the amount of attention required to interconnect the containers, the container 100 is shown as having two electrical contacts 144 and 146 extending through the lid 110 to an upper surface of the lid 110. When a second (not shown) container is stacked on the lid 110 of container 100, contacts on the underside of the second container will make contact with the contacts 144 and 146. A container internal cable 148 will then electrically connect a data or reader bus of the second container to the reader 138 by hidden wires not specifically shown in FIGS. 1 and 2. At some point, a master unit or controller, such as later shown FIGS. 4, 5 and 6, is connected to this data or reader bus. The mating contacts, also connected to the data or reader bus, used on the base or bottom of a container is more clearly shown in FIG. 2 as contacts 150 and 152.

Figure 3:
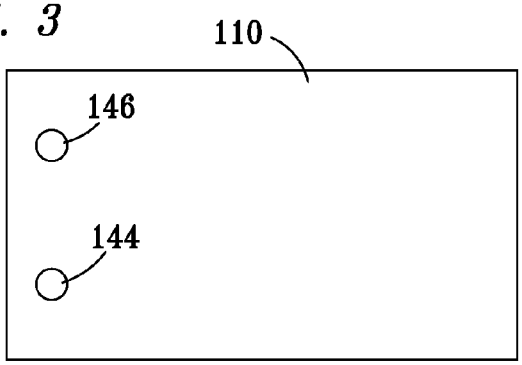
FIG. 3 exemplifies a rudimentary view of the manner in which the top and bottom of a container of FIG. 1 may be constructed to pass signals from container to container.

FIG. 3 is illustrative of the upper surface of the lid 110 or container 100 and shows contacts 144 and 146. While the design of these contacts is not explicitly shown, they may be merely contact surfaces or may be male and female as mentioned supra with respect to external cables. Also while shown as two separate contacts for clarity, a single interconnection area may also be used to provide any number of electrical signal transfer contacts.

An embodiment of this invention using cable to provide the reader or data bus interconnect between containers may be of a form shown in FIG. 4. As shown three containers 402, 404 and 406 are stacked one on top of the other. At the bottom of each container there is a recessed male connector portion. An unused one of such recessed male connector portion is designated as 408 on container 406. A cable 410 extends from an upper portion of container 406. Cable 410 has a female connector portion on the end (not specifically shown) which is connected to a mating connector, like connector 408, on a lower portion of container 404. In similar manner, a cable 412 electrically connects container 404 to container 402. As no further containers are shown stacked upon container 402, a further cable 414 is shown connected to a "master" unit 415 from an upper portion of container 402. The master unit retrieves data from each of the tag readers and any authorization portals connected to the reader bus of cable 414. A tag reader 416 is shown for reading ID tags within container 402. Similarly, tag readers 418 and 420 are attached to containers 404 and 406 respectively. Container locking mechanisms 422, 424 and 426, each similar in operation to lock 140 of FIG. 1, are shown attached respectively to containers 402, 404 and 406. Authorization portals 428, 430 and 432, operating in the same manner as portal 142 of FIG. 1, are shown between the lock and reader portions of containers 402, 404 and 406 respectively. The cables, such as cable 410, may be flat. Thus similar additional connecting cable and connector assemblies may be used on the remaining surfaces of the containers of FIG. 3 to stack adjacent containers in three dimensions in a manner similar to that shown in FIG. 5.

In FIG. 5 there is shown an assembly of twelve containers generally designated as 510. These containers are stacked three high, two wide and two deep. A container comprising an upper left front portion of the container assembly is further designated as 512. Each of the containers in the assembly has identical electrical signal contacts for interconnecting a reader or data bus to a master unit 514 shown in position on top of container 512 and in electrical contact with the reader or data bus of container 512 as well as the rest of the container assembly 512. Although the upper reader bus contacts of container 512 are not specifically shown they would occur in a manner identical to those shown as 516 on other container surfaces in FIG. 5. In a manner similar to that of FIG. 4, each of the containers in the container assembly 510 has an antenna bus connected ID tag reader 518, an authorization portal 520 and an electronically operated lock mechanism 522.

In FIG. 6, a master unit 600 is shown in more detail. While the components combined and/or assembled to provide the functions required of a master unit vary according to specific application, it will typically include a CPU (central processing unit) 602, random access and/or hard disk memory 604, GPS (ground position sensing) circuitry 606, wireless transceiver apparatus 608 and environmental or other sensing means 610. Also shown in the drawing are a plurality of solid line blocks representing containers designated as 612, 614 and 616. A further plurality of dash line blocks 618, 620 and 622 each represent one or more further containers stacked upon the respective containers 612, 614 and 616. Each of the blocks has a slave ID tag reader connected to a data or reader bus 626. The slave reader in container 612 is designated as S1. The slave reader in container 614 is designated as S2. An Nth slave reader in container block 616 is designated as Sn. Each of the container blocks includes a portion designated as 624. The portion 624 includes a locking function as well as an authentication or authorization function and thus is further labeled as "L&A". A sensing element 628 is additionally shown in container block 612. Although the only container block shown with a sensor is block 612, it should be apparent that any or all of the containers may include one or more sensing elements in accordance with any individual requirement of specific assets being secured or otherwise held within a given container. As shown, any data output by the one or more sensing elements is provided to the slave tag reader of that container for transmission to a master unit on the reader or data bus 626. As illustrated in FIG. 6, the master unit 600 receives data from each of the slave units via the data bus 626 and a data bus reader portion of the master 600.

Figure 2:
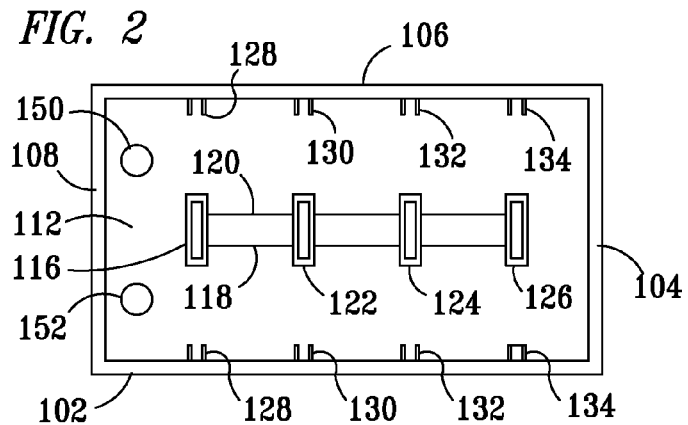
FIG. 2 exemplifies a top view of the container of FIG. 1.

As illustrated in FIGS. 1 and 2, an antenna bus, such as represented by conductor elements 118 and 120 along with the connectors 116, 122, 124 and 126 allow any combination of from one to four antennas in the container 100 in accordance with the size and number of tagged objects to be read. Where appropriate, the conductive elements may be connected to any number of further antennas including antennas embedded in or on the walls, bottom and top of the container although not specifically shown as such in FIG. 1.

Figure 7:
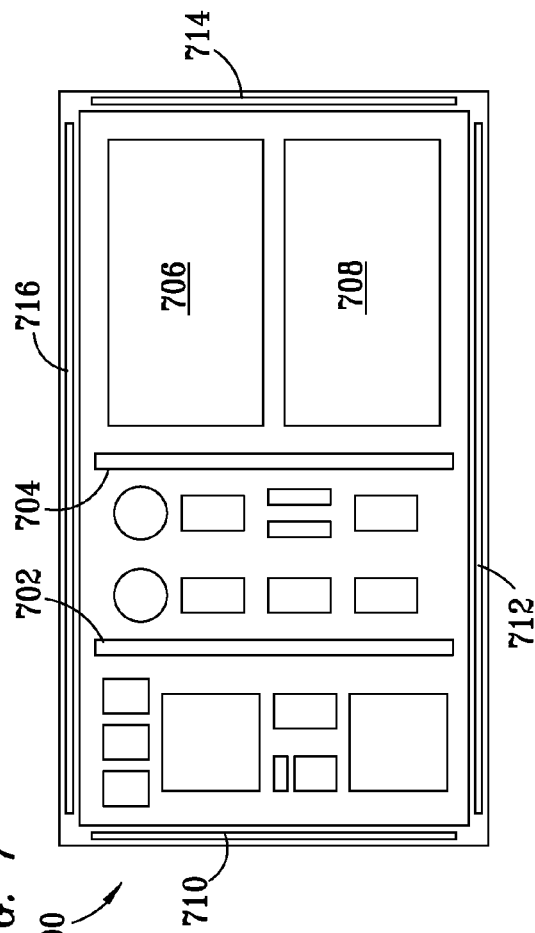
FIG. 7 exemplifies how an antenna bus may be used to readily adjust antenna spacing to accommodate large and/or small assets in a given container while maintaining ID tag reading accuracy.

This adaptability to tagged object size is illustrated in FIG. 7 where a container 700 is shown with an antenna 702 near the left end of container 700 and a second antenna 704 near the middle of the container 700. With this arrangement of the antennas, large packages such as ID tagged assets 706 and 708 may be positioned over unused antenna bus connectors (not shown). With only two tagged assets between antenna 704 and the right end of container 700, it is very likely that both tags will be read by a tag reader when it is connected to antenna 704. While there are a large number ID tagged assets shown on the left side of antenna 704, the ones not read by antenna 704 and between antenna 702 and 704 are very likely to be read by antenna 702. If it appears, while packing the container, that some of the ID tagged assets located between antenna 702 and the left side of the container, are not being read by antenna 702, another antenna may need to be inserted adjacent the left hand wall of container 700 in instances where additional antennas are not part of the walls of the container. However, since antennas comprising a portion of the walls of the container 700 are shown as 710, 712, 714 and 716 and since these antennas are also connected, or are connectable via a switch or DEMUX (multiplexer/demultiplexer), to the ID tag reader, no further plug-in antennas need be added to read all the tagged assets to the left of antenna 702. It should further be noted, that a single large tagged asset in the container may be monitored without any plug-in antennas having to be utilized in view of wall, bottom and lid antennas that may desirably be incorporated into the construction of the container.

Figure 8:
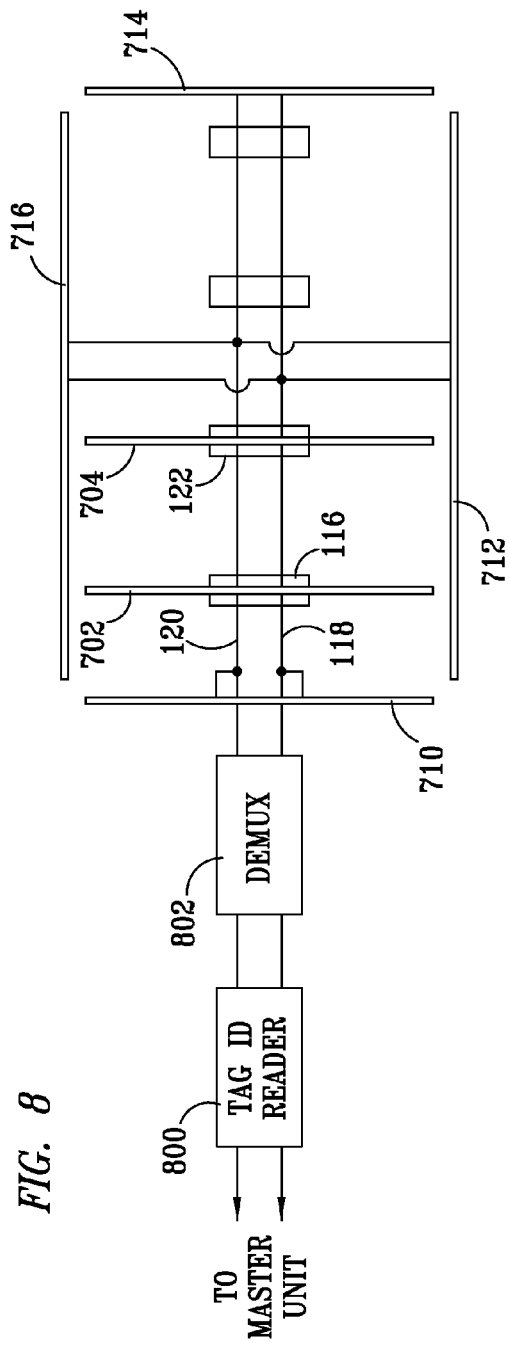
FIG. 8 comprises a circuit diagram that exemplifies an approach to reading tags that increases accuracy and aids in defining the exact location of a given tagged asset in a container.

In FIG. 8, a tag reader, such as the type of tag reader 138 of FIG. 1, is designated as 800. In the right hand portion of this figure a plurality of antennas are shown using the same designations as used in FIG. 7. Also in this portion of the figure, antenna buses and plug-in connectors are given the same designations as in FIG. 1. Between reader 800 and the antenna bus there is a DEMUX (multiplexer/demultiplexer) 802. Although not shown in the circuit diagram, each of the antenna connections, or alternatively the antennas themselves, is provided with a unique identification such that the DEMUX 802 may sequentially detect and apply power to each antenna.

Figure 9:
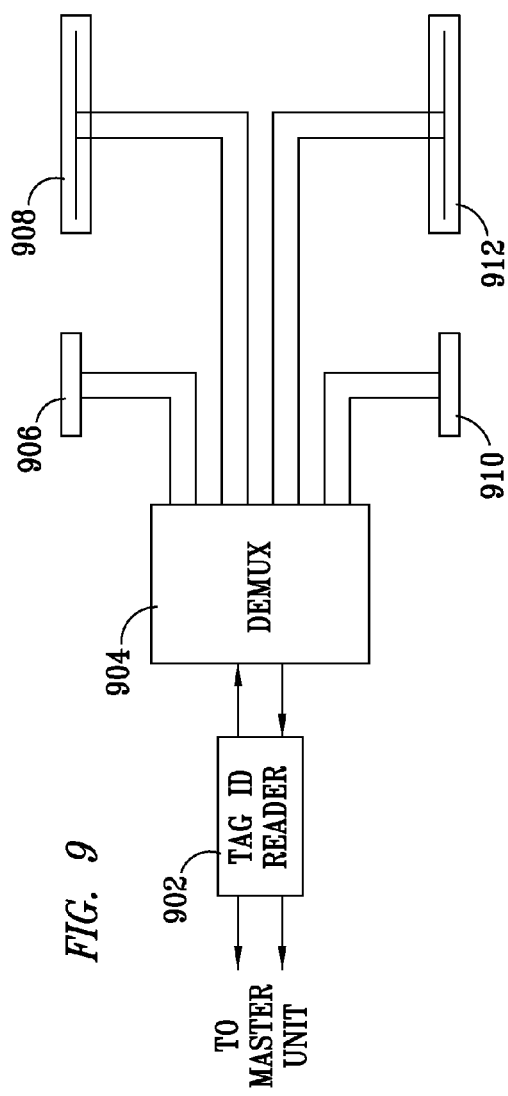
FIG. 9 exemplifies a second approach to reading tags that is a preferred embodiment and is faster than that shown in FIG. 8 but features the other qualities of the multiplex features of FIG. 8.

While FIG. 8 exemplifies an embodiment having a single set of antenna bus connectors and unique IDs for each antenna or it's connection to the bus, a separate set of electrical conductors may also be used for each embedded antenna and each plug-in connector to eliminate the need for unique IDs. Such an approach, which is actually the preferred embodiment since reading and switching may be accomplished much faster, is shown with minimal components in FIG. 9. A tag ID reader 902 is connected to a master unit data or reader bus. The reader 902 supplies signals to a DEMUX 904 to initiate a read operation as previously described. The DEMUX has separate sets of conductors going to each of any antenna plug-in connectors such as 906 and 908. Additionally, there are separate sets of conductors going to each of the embedded antennas such as those illustrated by indicators 910 and 912. Upon request, the DEMUX 904 sequentially, or in some other predetermined order, connects each embedded antenna or plug-in connector to the reader 902. When the tag reader is connected to an unused plug-in connector, the reader merely indicates that no tags were read at that position in the container and proceeds to the next antenna or connector. While the preferred embodiment uses more wires, it reduces the time to read data from a given antenna, supplies a more predictable and/or controllable power level to a given antenna and eliminates having to uniquely identify each antenna or antenna connection point to an antenna bus.

As is known, when a given power is supplied to an antenna bus, the power available for each antenna is reduced as additional antennas are connected to the bus. Thus, while a more simplistic approach shown in FIGS. 1 and 6 will operate satisfactorily in many applications, the application of power to a single antenna at a time will assure adequate power to each antenna and increase the likelihood of detecting all tagged assets in a container. An embodiment using the DEMUX 802 of FIG. 8 (or the DEMUX of FIG. 9) may also be used to indicate that a given tagged asset, as an example, is located between antenna 702 and the left side of the container. This determination will be reinforced when, or if, it is determined that the given asset tag was not detected by antennas 704 and 714.

From the above it will be apparent that the use of an antenna bus comprising a multitude of connectors, may be used to readily adapt a given size container to be able to accurately maintain an inventory of either large loosely packed or small closely packed ID tagged assets by altering the number and spacing of plug in antennas whereby each antenna is able to retrieve signals from all nearby tagged assets.

An RFID reader that can wirelessly maintain contact with a central computer and provide that central computer with global reader location coordinates and sensed environmental data as well as up to date container inventory data is much more costly than a reader that only collects and outputs tag data to a local data sink. Thus, it is very cost effective when a single device can be used to collect data from a large number of containers and transmit all of the collected data as well as location and other sensed data to a central computer in a single transmission burst.

The stacking of containers in up to three dimensions as shown in FIGS. 4 and 5 is thus illustrative of how data obtained from tag ID readers associated with a plurality of containers may be readily communicated over a data bus to a single master unit for collection before transmission.

A single master unit collecting data from a plurality of containers and transmitting the collected data is one preferred embodiment of the invention. However there are certainly instances where the location, access authorization and environmental conditions of a single container using the antenna bus structure of the present invention needs to be monitored. Thus a second preferred embodiment of the invention comprises modifying the reader of a single container, such as shown in FIG. 1, to include the transceiver, GPS and sensor portions of the master unit 600 of FIG. 6.

As is known in the industry, the shipment of many assets require temperature control of the shipping container. The control may be heating, cooling or a combination of heating and cooling in accordance with the environment external the shipping container. Such control is especially critical when pharmaceuticals are being shipped. Thus the smart containers shown in FIGS. 1 and 6 may be adapted from existing temperature controlled containers to additionally include the plug-in and/or permanent antenna structures, ID tag readers, multiplexers and so forth of the present invention. Such containers would incorporate at least temperature monitoring sensors. Some pharmaceuticals are sensitive to one or more of light, shock, vibration and humidity. Thus the circuitry in the tag reader and the master unit needs to be able to monitor many environmental conditions internal to and external to a given container and report the environmental data along with container location and tag asset data to a central database whereby any remedial action necessary to maintain the security as well as the quality of any assets in the container. In a preferred embodiment, the circuitry of the tag reader is operable to control the temperature and/or other internal environmental conditions of the container and well as monitor same.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. Apparatus for reading ID (IDentification) tagged objects within a container comprising:
    container means including internal and external surfaces;
    ID tag reader means comprising a portion of said container means operable to read tags internal said container via signals obtained from tag reading relocateable antenna structures located internal said container;
    an antenna bus comprising at least a portion of an internal surface of said container means, said antenna bus including a plurality of contact sets operable to receive signals from at least one inserted and relocatable antenna structure whereby an inserted antenna structure may be positioned intermediate tagged objects located within said container means;
    at least one antenna structure guide located internal said container means and aligned with at least one contact set of said antenna bus; and
    electrical signal means interconnecting said ID tag reader means and said antenna bus means.

2. Apparatus as claimed in claim 1 wherein:
    the tags of said tagged objects are RF (Radio Frequency) tags;
    said tag reader is operable to read RF tags located internal said container; and
    said apparatus comprises, in addition;
        container access control means for securing said ID tagged objects and operable to prevent unauthorized removal of said ID tagged objects from said container means,
        at least one relocateable antenna structure inserted in said at least one set of contacts and aligned with said at least one antenna structure guide, said at least one antenna structure being operable to receive RF signals from ID tags located internal said container, said at least one relocateable antenna structure operating to divide the interior of said container into separate sections,
        container access authorization circuitry, interconnected with said container access control means, operable to retrieve authorization data from entities attempting access to said container before said container access control means is permitted to revert to a container accessible condition,
        memory storage circuitry, including CPU means, and
        signal communication means operable to provide data signal communication between said CPU, said memory storage means, said tag reader, said container access control means and said container access authorization circuitry, whereby data retrieved from said ID tags and from said container access authorization circuitry is retained in said memory storage means.

3. Container apparatus for securely storing ID tagged objects comprising:
    means operable to detect unauthorized access to objects within said container apparatus;
    at least one antenna structure bus internal said container, said bus including at least one set of contacts for receiving an insertable antenna structure;
    at least one insertable antenna structure inserted in a set of contacts in said at least one antenna structure bus intermediate a plurality of ID tagged objects;
    tag reader means, operably connected to said antenna structure bus, whereby tag data of ID tagged objects in said container is retrievable via signals received by an antenna structure operably connected to contacts of said antenna structure bus; and
    memory means operable to store retrieved ID tag.

4. The apparatus of claim 3 comprising in addition:
    tag reader data signal outputs;
    electrical contacts on an external surface of said container operable to communicate tag reader data signal outputs of said container to mating contacts of an adjacent container whereby said tag reader data passes through said adjacent container to a master unit data collect and transceiver device.

5. Apparatus as claimed in claim 3 comprising:
    electrical contacts on an external surface of said container apparatus operable to transfer received antenna signals to a tag ID reader means of a further container placed in a signal transfer position with respect to said first container apparatus.

6. Apparatus for reading and securing ID (IDentification) tagged objects internal a container comprising:
    temperature controllable container means;
    ID tag reader means, including memory storage means, comprising a portion of said container means;
    at least one antenna structure located between internal surfaces of said container wherein tagged objects may placed on either side of said at least one antenna structure and operable when activated to communicate with said tagged objects located internal said container means;
    container access means operable upon commands from said tag reader to secure and/or to allow access to said container;
    authorization means, operating in conjunction with said ID tag reader means and said lock means, for permitting access to said container under predetermined conditions;
    GPS circuitry operable in conjunction with said ID tag reader means to store container location data in said tag reader memory means;
    transceiver circuitry, operable in conjunction with said ID tag reader means, for communicating tag data, location data and sensor data to a central database; and
    circuitry interconnecting said at least one antenna structure, said ID tag reader means, said authorization means, said GPS circuitry, said container access means and said transceiver means.

7. Apparatus as claimed in claim 6 comprising in addition:
    temperature control circuitry, comprising a portion of said tag ID reader, operable to effect control of the temperature of said container;
    an antenna bus comprising at least a portion of an internal surface of said container means, said antenna bus including at least one contact set operable to receive signals from an inserted antenna structure; and multiplex means, operable in conjunction with said ID tag reader, to sequentially and individually connect each antenna structure within said container to said ID tag reader means for retrieving ID tag data from tags located internal said container means.

8. Apparatus as claimed in claim 3 whereby, said means operable to detect unauthorized access comprises electrical signal controlled locking means, said at least one insertable antenna structure is positionally interconnected to a given set of contacts of said antenna bus in accordance with the physical size of at least one ID tagged object in said container and said apparatus additionally includes:

authorization circuitry operable to receive authenticating data from an entity requesting access to objects secured in said container apparatus, said authorization circuitry outputting a signal authorizing said signal controlled locking means to be changed to an unlocked condition when it is determined that the entity requesting access is so authorized wireless signal transmission means for outputting data stored in said memory means to external data retrieval apparatus; and CPU (Computer Processing Unit) means, operably interconnected to said tag reader means, said authorization circuitry, said memory means and said wireless signal transmission means for processing signals therebetween.

9. Apparatus as claimed in claim 6 comprising in addition:

controller means, interconnected between said ID tag reader means and a control input of said temperature controllable container means, operable to control the temperature of the container in accordance with data contained in a tag of at least one tagged object located within said container.

* * * * *